US008270066B2

United States Patent
Tang et al.

(10) Patent No.: US 8,270,066 B2
(45) Date of Patent: Sep. 18, 2012

(54) OPTICAL SPECTRUM SPLITTING FOR BLACK COLOR DISPLAY

(75) Inventors: Liang Tang, Vancouver, WA (US); Akinori Hashimura, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 255 days.

(21) Appl. No.: 12/873,138

(22) Filed: Aug. 31, 2010

(65) Prior Publication Data

US 2011/0109870 A1 May 12, 2011

Related U.S. Application Data

(63) Continuation-in-part of application No. 12/836,121, filed on Jul. 14, 2010, which is a continuation-in-part of application No. 12/646,585, filed on Dec. 23, 2009, now Pat. No. 8,223,425, which is a continuation-in-part of application No. 12/635,349, filed on Dec. 10, 2009, which is a continuation-in-part of application No. 12/621,567, filed on Nov. 19, 2009, which is a continuation-in-part of application No. 12/614,368, filed on Nov. 6, 2009, now Pat. No. 8,045,107.

(51) Int. Cl.
*G02B 26/00* (2006.01)
*G02F 1/1335* (2006.01)

(52) U.S. Cl. ........................................ 359/296; 349/106
(58) Field of Classification Search .................. 359/296, 359/578, 900
See application file for complete search history.

(56) References Cited

U.S. PATENT DOCUMENTS

2007/0114523 A1* 5/2007 Oumi et al. ...................... 257/40
2008/0142819 A1* 6/2008 Liu et al. ......................... 257/89

FOREIGN PATENT DOCUMENTS

JP 2000-098323 4/2000
JP 2010-185970 8/2010

* cited by examiner

*Primary Examiner* — James Jones
(74) *Attorney, Agent, or Firm* — Law Office of Gerald Maliszewski; Gerald Maliszewski

(57) ABSTRACT

A display device is provided for reflecting a black color, as enabled by an optical splitting photonic liquid crystal waveguide. Sets of top and bottom electrodes are formed in a periodic pattern. A first dielectric layer overlies the set of bottom electrodes, made from a liquid crystal (LC) material with molecules having dipoles responsive to an electric field. A plasmonic layer, including a plurality of discrete plasmonic particles, is interposed between the sets of top and bottom electrodes, and is in contact with the first dielectric layer. A voltage potential is applied between the top and bottom electrodes, generating an electric field. Dipole local orientation and non-orientation regions are created in the liquid crystal molecules in response to the electric field, and a wavelength of light outside the visible spectrum is reflected in response to optical spectrum splitting of the incident light.

19 Claims, 7 Drawing Sheets

(PENDING ART)

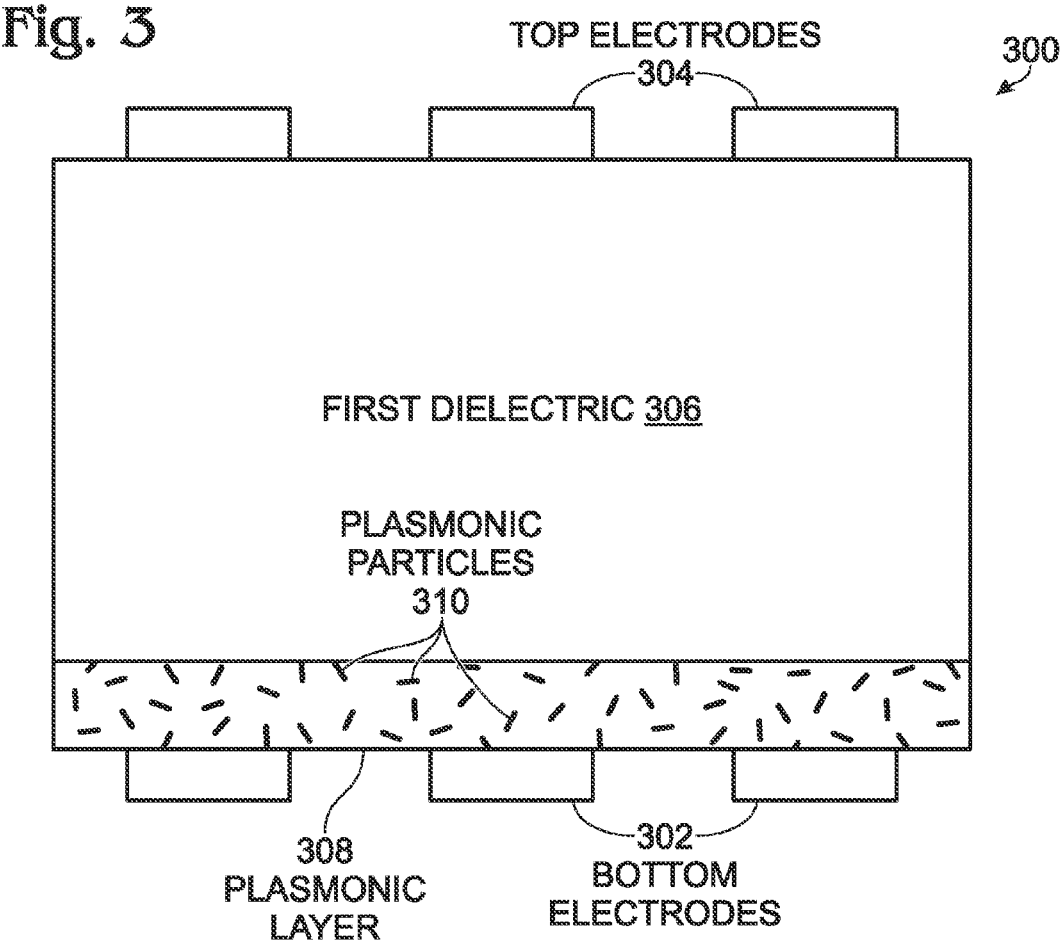
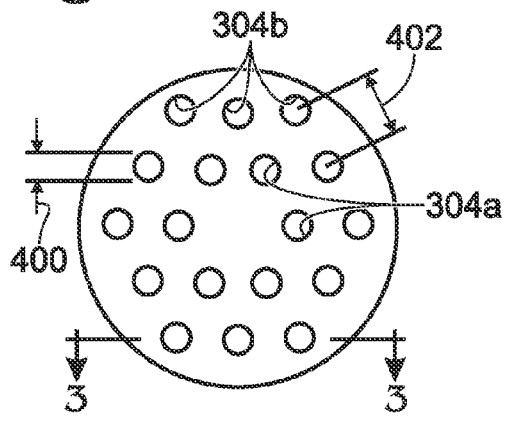
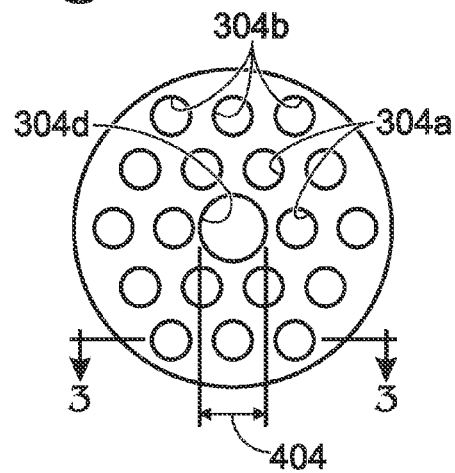

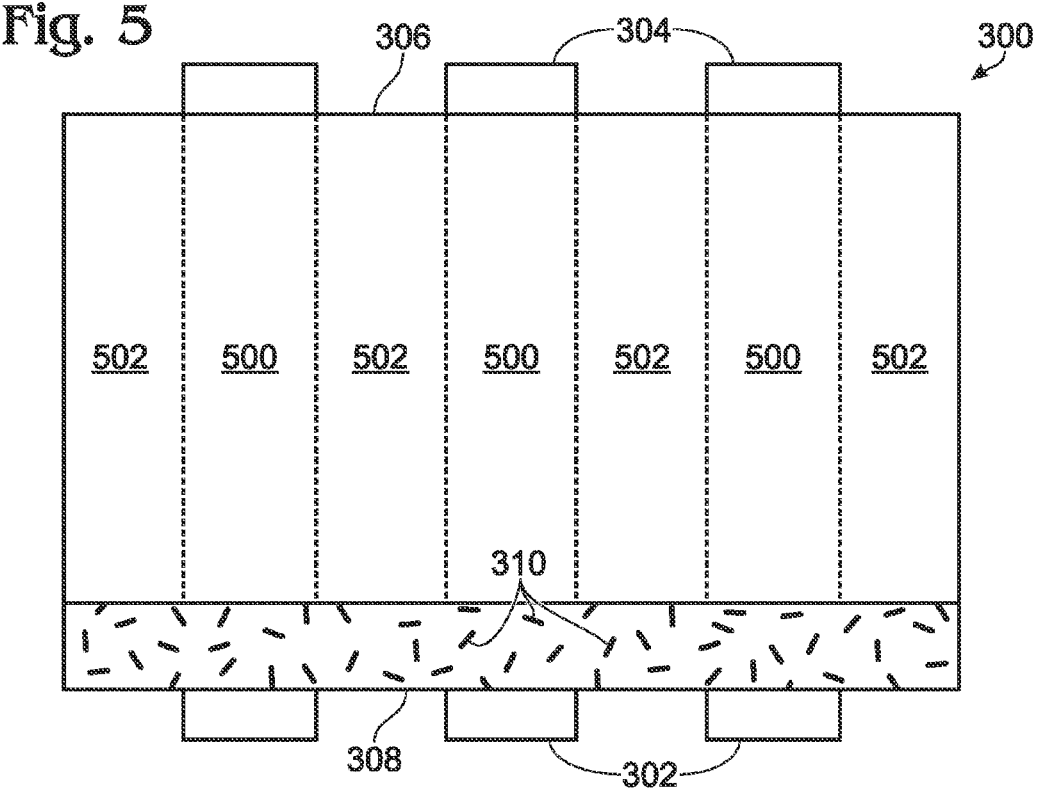
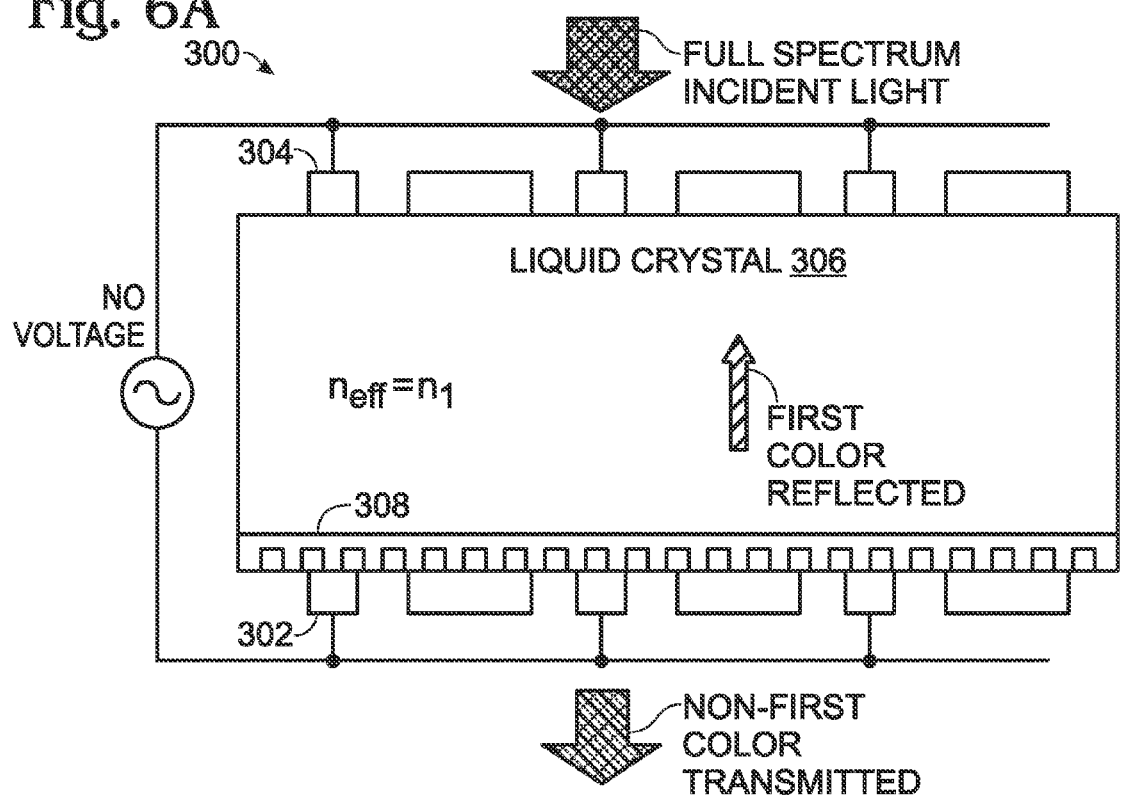

OPTICAL SPECTRUM SPLITTING FOR BLACK COLOR DISPLAY

RELATED APPLICATION

The application is a Continuation-in-Part of a pending application entitled, PLASMONIC ELECTRONIC SKIN, invented by Tang et al., Ser. No. 12/836,121, filed on Jul. 14, 2010, which is a Continuation-in-Part of a application entitled, PLASMONIC DEVICE TUNED USING PHYSICAL MODULATION, invented by Tang et al., Ser. No. 12/646,585, filed on Dec. 23, 2009, now U.S. Pat. No. 8,223,425;

which is a Continuation-in-Part of a pending application entitled, PLASMONIC DEVICE TUNED USING LIQUID CRYSTAL MOLECULE DIPOLE CONTROL, invented by Tang et al., Ser. No. 12/635,349, filed on Dec. 10, 2009, which is a Continuation-in-Part of a pending application entitled, PLASMONIC DEVICE TUNED USING ELASTIC AND REFRACTIVE MODULATION MECHANISMS, invented by Tang et al., Ser. No. 12/621,567, filed on Nov. 19, 2009, which is a Continuation-in-Part of a application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S. Pat. No. 8,045,107. All the above-referenced applications are incorporated herein by reference.

BACKGROUND OF THE INVENTION

1. Field of the Invention

This invention generally relates to electronic visual display devices and, more particularly, to a color-tunable plasmonic display device that creates a "black" color by splitting an incident optical spectrum.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixels of this type cannot produce saturated colors with a good contrast.

Some reflective displays face reliability problem over a long lifetime. In particular, to sustain video rate operation for a few years requires at least billions of reversible changes in optical properties. Achieving the desired number of cycles is particularly difficult. in reflective displays using techniques based on chemical reactions, techniques that involve mixing and separation of particles, or MEMS technology that involves repeated mechanic wear or electric stress.

FIG. 1 is a partial cross-sectional view of nanoplasmonic display in which the color tuning is accomplished by electrical modulation of the refractive index of an electro-optical material such as a liquid crystal (pending art). Details of the device 100 can be found in the pending application entitled, COLOR-TUNABLE PLASMONIC DEVICE WITH A PARTIALLY MODULATED REFRACTIVE INDEX, invented by Tang et al., Ser. No. 12/614,368. Because of the limited refractive index (n) change of dielectric 106 materials such as liquid crystal, the color tuning range of a device using just this tuning modulation means is very limited. Thus, the device of FIG. 1 uses an additional color tuning mechanism, as described below.

FIG. 2 is a graph simulating the relationship between resonant wavelength change and refractive index for a liquid crystal material surrounding an Ag nanoparticle with a diameter of 80 nanometers. For example, the highest birefringence liquid crystal commercially available only has a Δn of 0.3, which provides a tuning range of only 80 nm, based on the simulation result in FIG. 2. Research labs have reported liquid crystals with a Δn as high as 0.79, but the performance of such materials is not guaranteed. Besides, these materials may not have the appropriate response time or threshold voltage required for the nanoplasmonic display application.

As noted above, the birefringence effect of liquid crystals creates an effective refractive index change that is smaller than the nominal value Δn. This results in a smaller wavelength tuning range than predicted, if an isotropic dielectric medium is assumed. Also, the reflected color has a strong angle dependence if the liquid crystal molecules are uniformly aligned with the electric field passing through the liquid crystal medium. In order to achieve a commercially successful product, both challenges need to be overcome.

In the above-mentioned displays, light wavelength tuning is primarily based on the modulation of the refractive index of liquid crystal in response to an applied electrical field. However, because of the limited index tuning range of liquid crystals, it is particularly challenging to achieve the "black" state, for which the plasmonic resonance needs to be tuned out of the visible wavelength range.

It would be advantageous if a black color state could be achieved for a reflective display without significantly tuning the index of refraction of a medium.

SUMMARY OF THE INVENTION

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics.

Described herein is a method to split the incident optical spectrum and achieve a black state for reflective displays without the need of large refractive index tuning. First, liquid crystal (LC) molecules are electrically manipulated to form optical waveguides. The use of patterned electrodes results in a periodic index modulation within LC cells due to the alignment of LC molecules in accordance with electrical fields. Secondly, a photonic crystal waveguide is used that is based upon an explicitly designed periodic electrode pattern. These photonic crystal waveguides can split incident optical spectrum into different physical regions within the pixel. Thirdly, the pixel reflects no visible color when the applied voltages are specified within a certain range of values, therefore showing the black state without the need for large refractive index tuning.

Accordingly, method is provided for reflecting a black color in a display device enabled with an optical splitting photonic liquid crystal waveguide. The reflective display device includes a set of bottom electrodes formed in a periodic pattern, and a set of top electrodes formed overlying the set of bottom electrodes in the periodic pattern. A first dielectric layer overlies the set of bottom electrodes, made from a liquid crystal (LC) material with molecules having dipoles responsive to an electric field. A plasmonic layer, including a plurality of discrete plasmonic particles, is interposed between the sets of top and bottom electrodes, and is in contact with the first dielectric layer. The method accepts a full-spectrum visible light incident to the top electrode. A first primary color is reflected, where a primary color exhibits a single wavelength peak with a spectral full width at half magnitudes (FWHMs) in the visible spectrum of light. Subsequently, a voltage potential is applied between the top and bottom electrodes, generating an electric field. A dipole local orientation is created in the liquid crystal molecules in response to the electric field, and a wavelength of light outside the visible spectrum is reflected in response to the LC molecule dipole local orientation.

The first dielectric exhibits a first index of refraction, associated with the first primary color, in response to a lack of dipole local orientation in the LC molecules. In contrast, the electric field creates a dipole local orientation in a plurality of local orientation regions in the first dielectric, where each local orientation region is interposed between corresponding electrodes in the top and bottom sets of electrodes. Simultaneously, a lack of dipole local orientation in the LC molecules remains in a local non-orientation region of the first dielectric surrounding the plurality of local orientation regions. Thus, the first dielectric exhibits the first index of refraction to the accepted light in the local non-orientation region, while exhibiting a second index of refraction to the accepted light in response to the local orientation regions. Exhibiting the first and second indexes of refraction in different physical regions of the dielectric results in optical spectrum splitting of the incident light, and a wavelength of light outside the visible spectrum is reflected in response to splitting the optical spectrum. That is, a photonic-crystal waveguide is formed splitting the incident visible spectrum, and no visible light is reflected at the exit of the photonic-crystal waveguide where the plasmonic layer is located.

Additional details of the above-described method, as well as a. display device with an optical splitting photonic liquid crystal waveguide, are provided below.

BRIEF DESCRIPTION OF THE DRAWINGS

FIG. 3 is a partial cross-sectional view of a display device with an optical splitting photonic liquid crystal waveguide.

FIGS. 4A and 4B are plan views of the display device of FIG. 3 showing exemplary top electrode patterns.

FIG. 5 is a partial cross-section view of the display device of FIG. 3 when a voltage potential is created between the top and bottom sets of electrodes.

FIGS. 6A and 6B are partial cross-sectional views of the display device of FIG. 3 showing operation of the device in greater detail.

DETAILED DESCRIPTION

Figure 1:
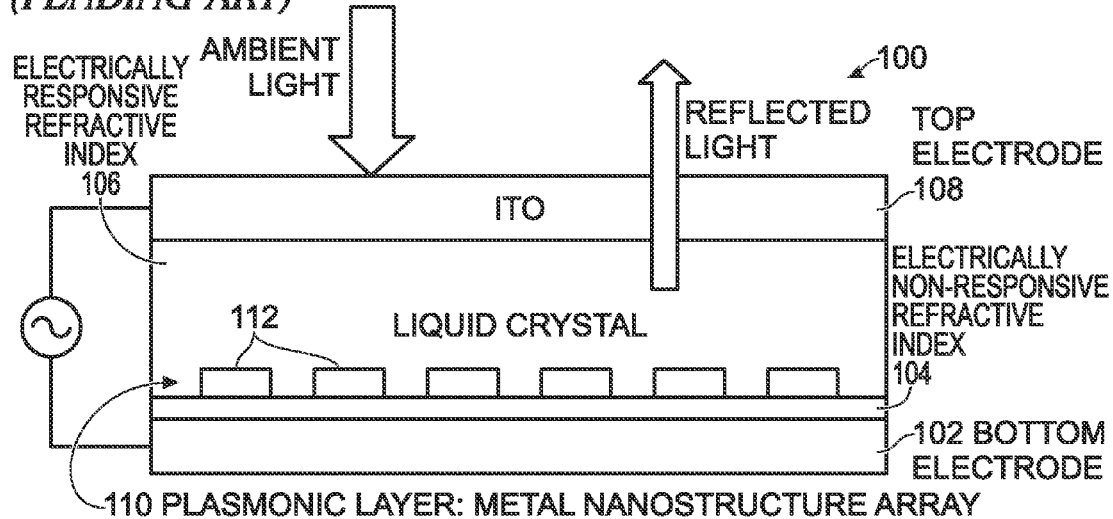
FIG. 1 is a partial cross-sectional view of nanoplasmonic display in which the color tuning is accomplished by electrical modulation of the refractive index of an electro-optical material such as a liquid crystal (pending art).
Figure 2:
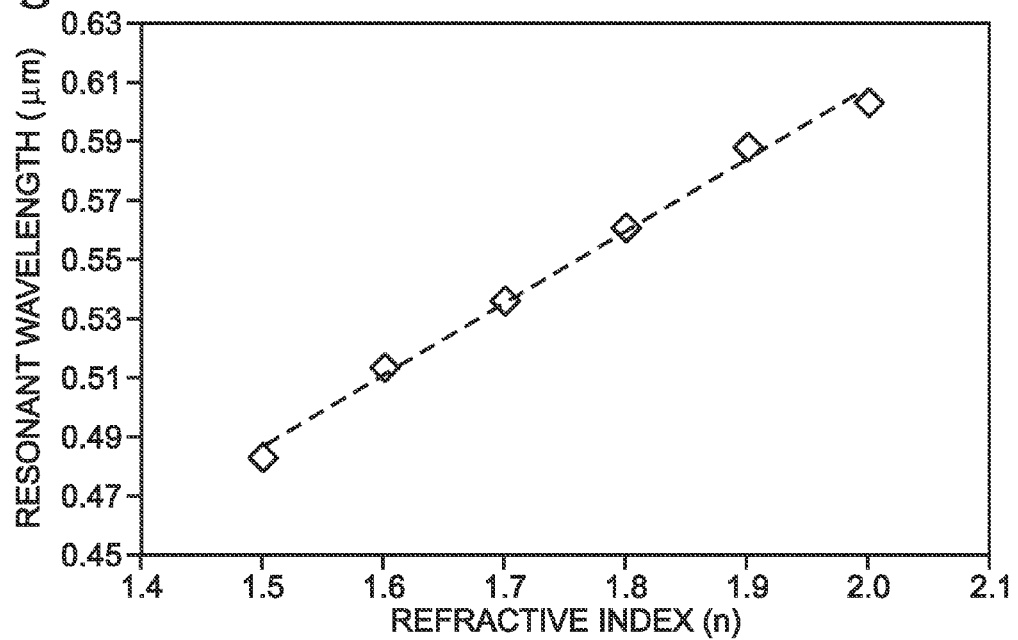
FIG. 2 is a graph simulating the relationship between resonant wavelength change and refractive index for a liquid crystal material surrounding an Ag nanoparticle with a diameter of 80 nanometers.

FIG. 3 is a partial cross-sectional view of a display device with an optical splitting photonic liquid crystal waveguide. The device 300 comprises a set of bottom electrodes 302 formed in a periodic pattern. That is, the electrodes are formed in a reoccurring arrangement. As described in more detail below, one example of a periodic pattern is an equilateral triangle lattice with hexagonal outer boundaries. A set of top electrodes 304 is formed overlying the set of bottom electrodes 302 in the periodic pattern. For example, the sets of top and bottom electrodes 304/302 may be a transparent material such as indium tin oxide (ITO) ZnO, Ag nanowires, or carbon nanotubes. A first dielectric layer 306 overlies the set of bottom electrodes 302, made from a liquid crystal (LC) material with molecules having dipoles responsive to an electric field. A plasmonic layer 308, including a plurality of discrete plasmonic particles 310, is interposed between the sets of top and bottom electrodes 304/302, and in contact with the first dielectric layer 306.

The plasmonic layer particles 310 may come in a variety of structures and orientations. In one aspect, the plasmonic particles have a center-symmetric structure. Dome and cup structures are examples of center-symmetric shapes. Center-symmetric shapes tend to reduce the dependency between reflectivity and viewing angle. Some other examples of particle structures include composite shell, egg, disk, sphere, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. Note: the device may be enabled using other structures, as an exhaustive collection of structures and shapes in not shown. The plasmonic particles have a uniform structure (shape), and a size that varies.

The plasmonic particles 310 in the plasmonic layer 308 may be arranged in a random order or symmetrical array. Further, the particles may be arranged in a wide variety of two dimensional and three dimensional array patterns that are known in the art. The plasmonic particles may be a material such as Ag, Au, Cu, Pt, Al, or alloys of the above-mentioned metals. Typically, the plasmonic particles may have a size in the range of 10 nanometers (nm) to 300 nm, and a spacing between particles in the range of about 700 nm, or less.

FIGS. 4A and 4B are plan views of the display device of FIG. 3 showing exemplary top electrode periodic patterns. Note: the pattern of the bottom electrode set is the same as the top electrode set. In FIG. 4A, the periodic pattern of top electrodes 304 includes an inner circle of electrodes 304a, each having a first diameter 400, where adjacent electrodes are separated by a first pitch 402. The periodic pattern also includes an outer hexagon of electrodes 304b, each having the first diameter 400, wherein adjacent electrodes are separated by a first pitch 402. Adjacent electrodes in the inner circle 304a and outer hexagon 304b are separated by the first pitch 402. In some aspects, the pattern of top (and bottom) electrodes includes a plurality of concentrically arranged outer hexagons of electrodes. Although not shown, electrodes may be arranged in a plurality of concentric outer hexagons, and the periodic pattern is not limited to any particular number of outer hexagons.

The periodic pattern of FIG. 4B is similar to the one of FIG. 4A, except that the periodic pattern includes a defect. In this example the defect is the addition of a center electrode 304d having a second diameter 404 greater than the first diameter 400. Only one outer hexagon of electrodes 304b is shown. However, the periodic pattern is not limited to any particular number of outer hexagons.

For example, the first diameter 400 may be about 100 nanometers (nm) and the first pitch 402 between electrode centers may be about 300 nm. In this scenario, the display reflects light with a wavelength of about 650 nm in response to applying a potential of zero volts between the top and bottom sets of electrodes.

It should be understood that there are many other periodic patterns that may exist which will create an effective index of refraction in the first dielectric that results in the display device reflecting a color (i.e. black color) that is outside the visible spectrum. The above-described patterns are simply an example to illustrate the device. The device is not limited to any particular pattern type: It should also be understood that the optical splitting effect associated with the periodic pattern may be enabled with other types of pattern defects.

Returning the FIG. 3, the first dielectric layer 306 has a first index of refraction in response to a potential of zero volts between the sets of top and bottom electrodes 304/302. The display 300 reflects a first color in the visible light spectrum in response to accepting full visible spectrum incident light, and in response to zero voltage between the top and bottom sets of electrodes 304/302.

FIG. 5 is a partial cross-section view of the display device of FIG. 3 when a voltage potential is created between the top and bottom sets of electrodes. In this case the first dielectric layer 306 has an index of refraction pattern that includes a plurality of second index of refraction regions 500 and a first index of refraction region 502 formed in response to a first voltage and the pattern of electrodes. As shown, the second index of refraction regions 500 are formed in the first dielectric 306 in columns between each electrode in the top set of electrodes 304 and a corresponding bottom electrode 302. The first index of refraction region 502 is formed in the first dielectric 306 surrounding the second index of refraction regions 500. The display 300 reflects no color (i.e. black) in the visible spectrum in response to the first voltage between the top and bottom sets of electrodes 304/302.

Figure 6B:
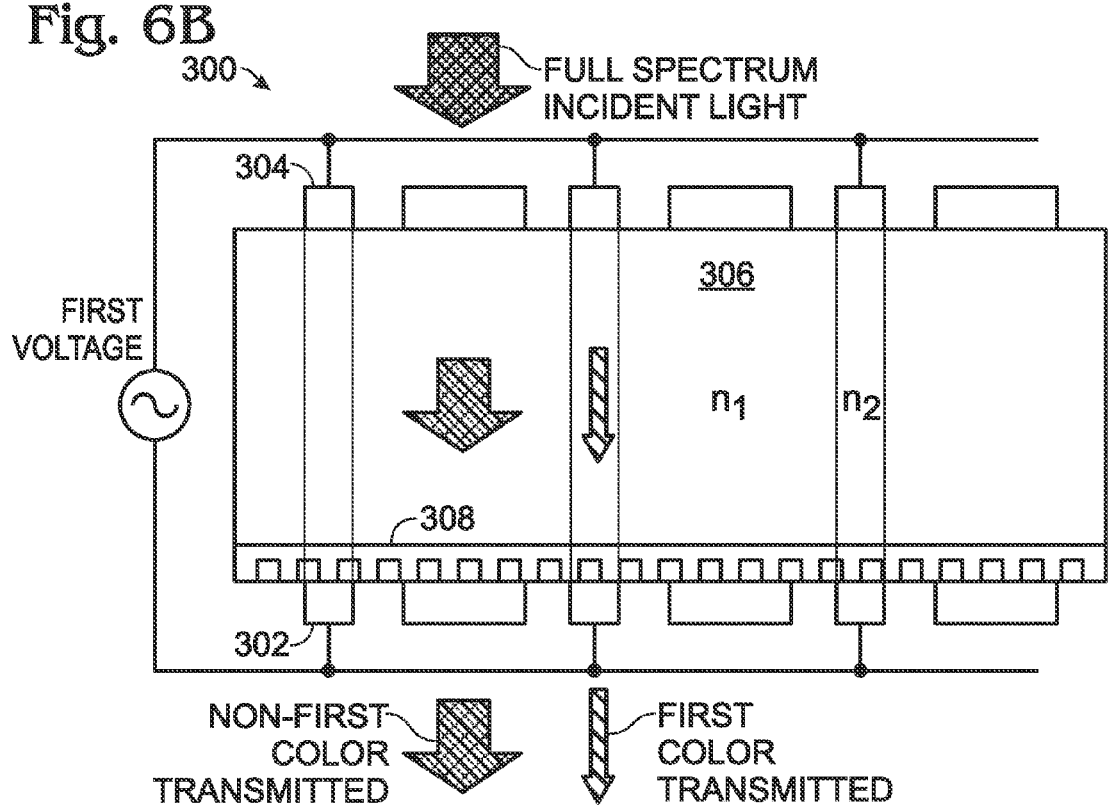

FIGS. 6A and 6B are partial cross-sectional views of the display device of FIG. 3 showing operation of the device in greater detail. In FIG. 6A, a full spectrum is provided and the device 300 reflects a first color (e.g., red), while all the other colors in the visible spectrum are transmitted through the device. In FIG. 6B, the first color (e.g., red) is transmitted through the second index of refraction regions 500 (see FIG. 5) in response to the first voltage. A first non-color (e.g., all colors but red red) is transmitted through the first index of refraction region 502 in response to the first voltage. The index of refraction pattern in the first dielectric 306 optically splits the spectrum of incident light. The display reflects light having a wavelength outside the visible spectrum in response to optical spectrum splitting, which occurs as the result of channeling the first color (spectrum) of light through the first index of refraction region 502, and channeling the non-first color (spectrum) of light through the second index of refraction regions 500 one familiar example of optical splitting is a prism. Both the first color in regions 500 and the non-first color in region 502 will transmit through the plasmonic layer without inducing reflection. Therefore, no visible light is reflected. The mechanism of the "black state" is not based on an overall "effective refractive index", but based on the detailed refractive index distribution in first dielectric, which is determined the electrode pattern.

Figure 7:
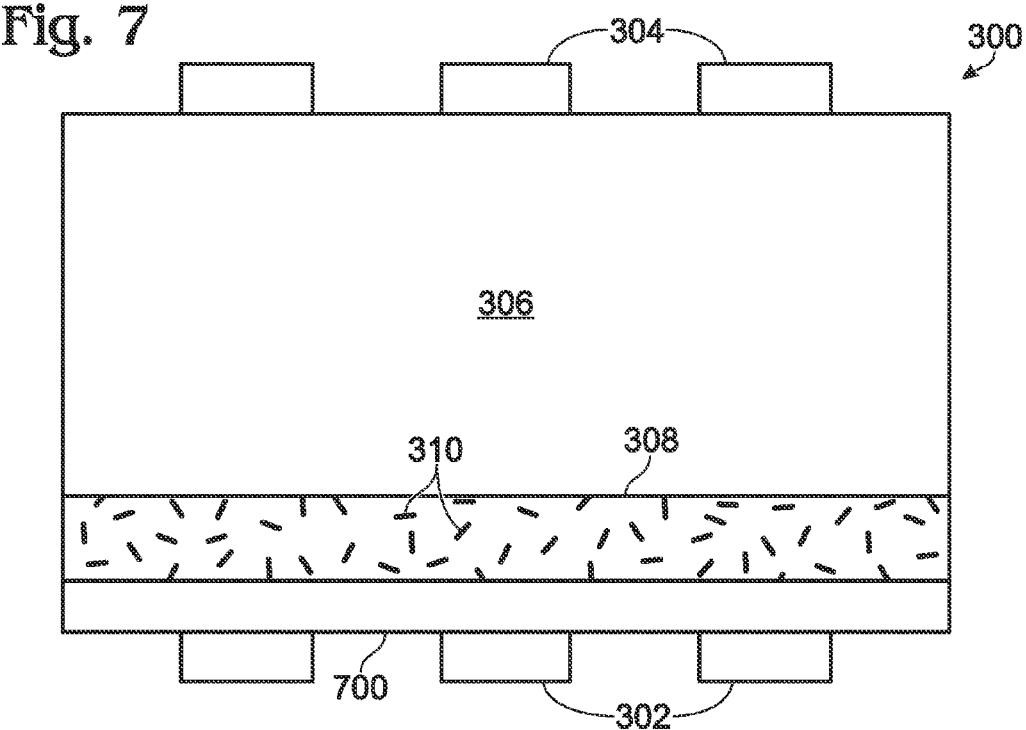
FIG. 7 is a partial cross-sectional view showing a variation of the display device of FIG. 3.

FIG. 7 is a partial cross-sectional view showing a variation of the display device of FIG. 3. In this aspect a second dielectric layer 700, made from an electrically non-conductive material, is interposed between the plasmonic layer 308 and bottom electrodes 302. If the plasmon layer 308 overlies the first dielectric (not shown), the second dielectric layer can be placed between the plasmonic layer and the top set of electrodes.

FUNCTIONAL DESCRIPTION

Plasmons, which are quantized oscillations of the free electron gas in a metal or other material, affect how light interacts with a structure and thereby determine the apparent color of the structure. This phenomenon generally occurs through the coupling of surface plasmons with light, to form surface plasmon-polaritons. Tuning the color of metal nanostructures is possible because the plasmon resonant frequency of such structures generally depends on the size, shape, distance between plasmonic particles, and the dielectric properties of the surrounding material. Thus, the optical absorption and scattering spectra (and therefore the color) of metal structures can be varied by altering any one or more of these characteristics.

Scientists and engineers are able to use liquid crystals in a variety of applications because external perturbation can cause significant changes in the macroscopic properties of the liquid crystal system. Both electric and magnetic fields can be used to induce these changes. The magnitudes of the fields, as well as the speed at which the molecules align are important characteristics with which the industry deals. Finally, special surface treatments can be used in liquid crystal devices to force specific orientations of the director.

Figure 8:
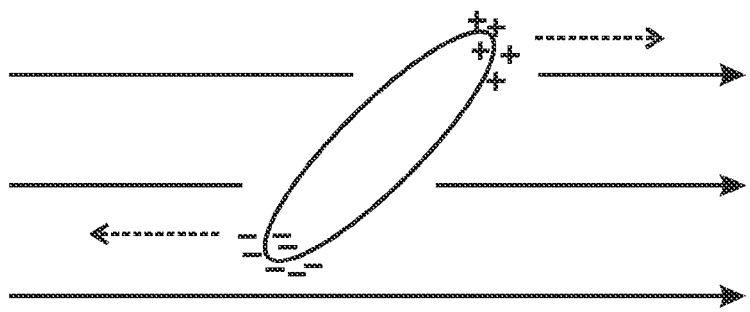
FIG. 8 is a diagram of a liquid crystal molecule influenced by an electric field due to a permanent or induced dipole.

FIG. 8 is a diagram of a liquid crystal molecule influenced by an electric field due to a permanent or induced dipole. The response of liquid crystal molecules to an electric field is the major characteristic utilized in industrial applications. The ability of the director to align along an external field is caused by the electric nature of the molecules. Permanent electric dipoles result when one end of a molecule has a net positive charge while the other end has a net negative charge. When an external electric field is applied to the liquid crystal, the dipole molecules tend to orient themselves along the direction of the field. The solid line arrows represent the electric field vector and the dotted line arrows show the electric force on the molecule.

Even if a molecule does not form a permanent dipole, it can still be influenced by an electric field. In some cases, the field produces a slight re-arrangement of electrons and protons in molecules such that an induced electric dipole results. While not as strong as permanent dipoles, an orientation with the external field still occurs.

Because of the birefringence of liquid crystal materials, the effective refractive index that each metal nanoparticle "sees" is in fact a squared average of the indexes along two directions. Therefore, depending on the LC molecule alignment, different effective indexes can be achieved. If all the LC molecules are aligned in parallel to a plasmonic layer, the effective index reaches its minimum value $n_o$, i.e., the ordinary refractive index value. If the LC molecules are aligned perpendicular to the surface of the plasmonic layer, the effective index reaches the maximum value square root of $((n_e^2 + n_o^2)/2)$. This refractive index change is the largest value that can be achieved with a nematic liquid crystal.

Figure 9:
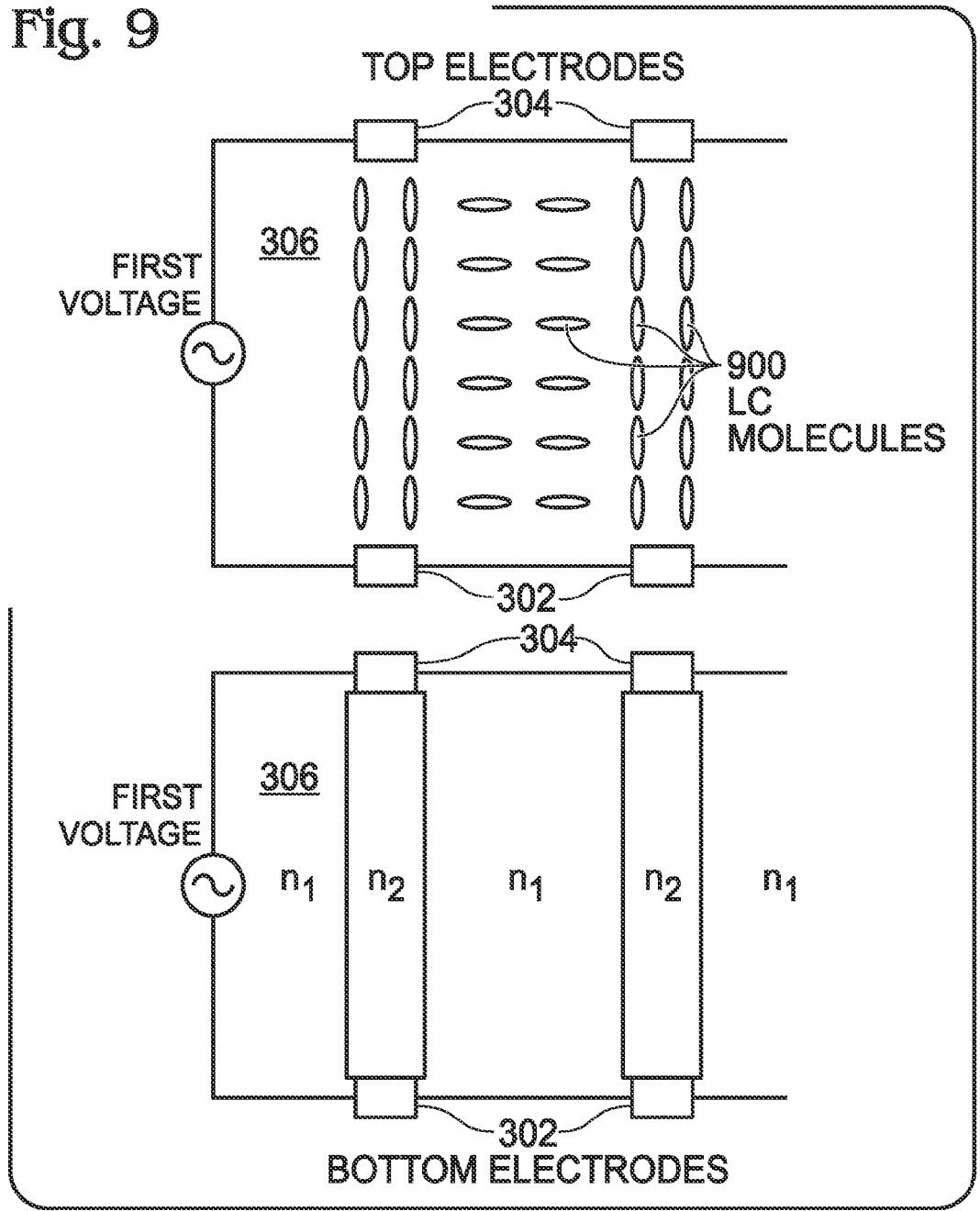
FIG. 9 depicts cross-section views showing the formation of an optical waveguide array by electrical field modulation within liquid crystal cells.

FIG. 9 depicts cross-section views showing the formation of an optical waveguide array by electrical field modulation within liquid crystal cells. Because liquid crystal molecules 900 respond to an applied electrical fields, electrode patterns we be designed to form optical waveguides within the LC cells. In the left figure, when a potential exists between the top and bottom electrodes, the LC molecules 900 align according to the field lines, showing different orientations in different regions. The regions with stronger electrical fields typically have more re-orientation of LC molecules. In the right side, these different orientations result in distinct regions with different effective refractive indexes. Because of the birefringence of liquid crystal materials, the effective refractive index that each plasmon particle "sees" is in fact a squared average of the indexes along two directions. Therefore, the periodic index modulation is achieved within LC cells due to the alignment of LC molecules according electrical fields.

Because of the periodic index modulation, optical waveguides and waveguide arrays of all kinds can be formed. For example, if a contact (electrode) is patterned into a circular shape, a cylindrical waveguide can be formed with applied voltages. Note: for clarity the plasmonic layer is not shown.

Previously, in order to achieve the black state, the plasmonic resonance of a display device needed to be tuned out of the visible light range, and the reflected light would be either in near-infrared or UV range, and therefore not visible. Since liquid crystal has a limited index tuning range, this is very challenging to accomplish. Returning to FIGS. 6A and 6B, a new architecture is presented to achieve the black state by splitting the incident optical spectrum into different regions. In FIG. 6A, the display cell reflects a red (first) color when the effective index is $n_1$. In this state, the plasmonic resonance of red corresponds to the index $n_1$. In FIG. 6B, the red light is separated apart from the rest of the wavelengths by channeling light of different wavelengths into different optical waveguides. If spectrum splitting is achieved, neither red light nor other wavelengths is reflected ("black state"). The plasmonic structure reflects red light when the first dielectric refractive index $n=n_1$. Red light is not reflected when $n=n_2$. Other wavelengths are not reflected when $n=n_1$.

Based on this principle, there may be many different waveguide array designs that can be used to achieve the goal of spectrum splitting and thus black state. Disclosed herein are designs utilizing photonic crystal waveguides.

The photonic-crystal waveguide or fiber (PCF) designs depicted in FIGS. 4A and 4B may be enabled using a new class of optical fiber based on the properties of photonic crystals. Because of its ability to confine light in hollow cores or with confinement characteristics not possible in conventional optical fiber, PCF is now finding applications in fiber-optic communications, fiber lasers, nonlinear devices, high-power transmission, highly sensitive gas sensors, and other areas. More specific categories of PCF include photonic-bandgap fiber (PCFs that confine light by band gap effects), holey fiber (PCFs using air holes in their cross-sections), hole-assisted fiber (PCFs guiding light by a conventional higher-index core modified by the presence of air holes), and Bragg fiber (photonic-bandgap fiber formed by concentric rings of multilayer film).

Figure 10A:
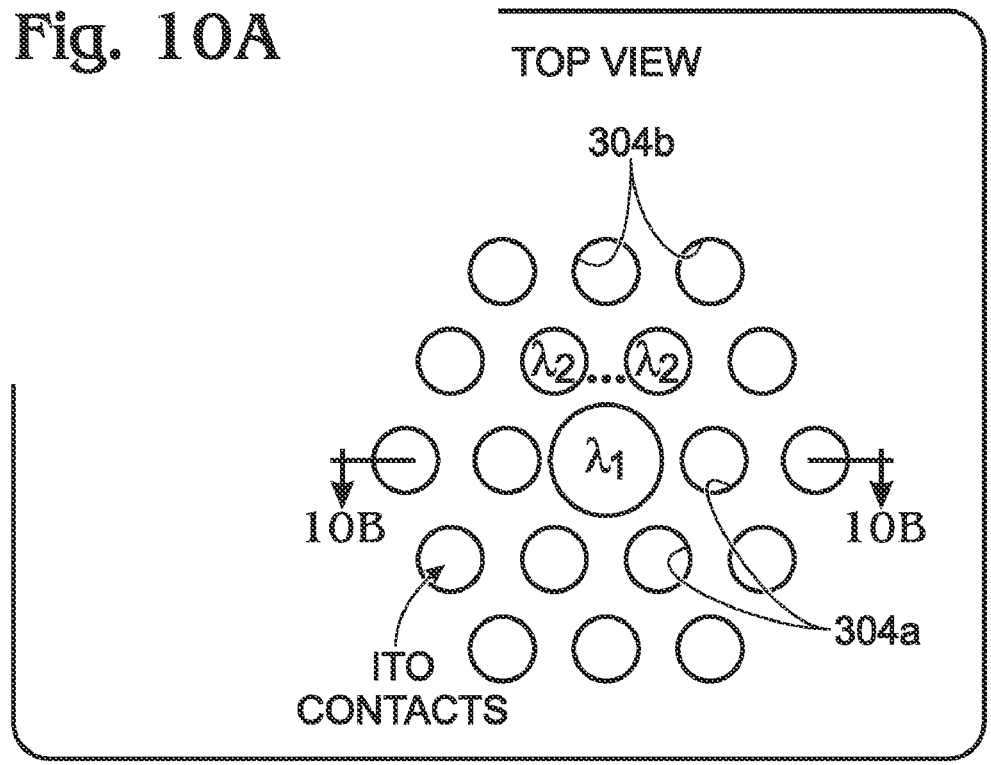
FIGS. 10A and 10B illustrate, respectively, plan and partial cross-sectional views depicting a second variation of a display device of FIG. 3.
Figure 10B:
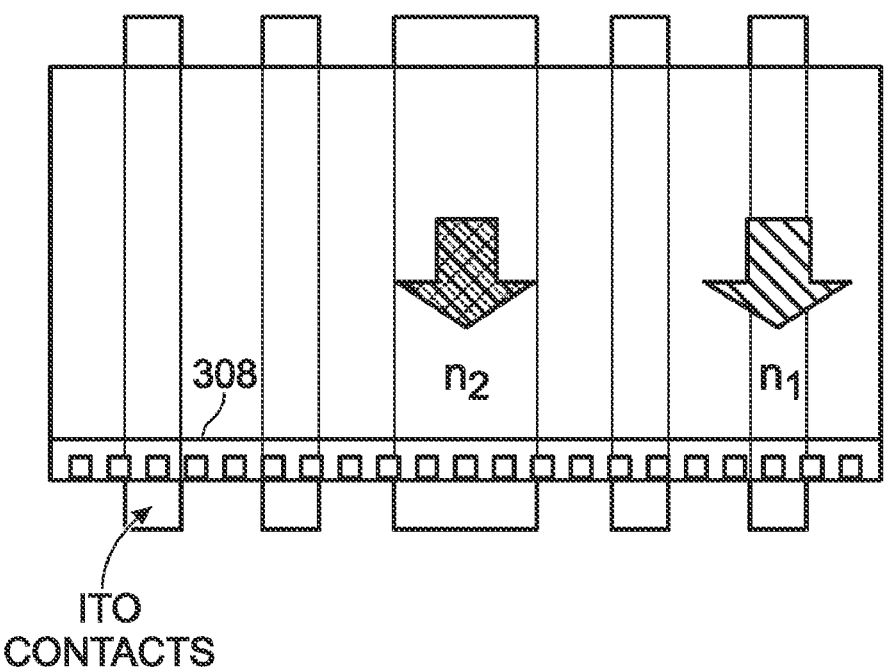

FIGS. 10A and 10B illustrate, respectively, plan and partial cross-sectional views depicting a second variation of a display device of FIG. 3. The photonic crystal waveguide can confine a narrow portion of the incident optical spectrum and be used for optical spectrum splitting. When the photonic bandgap structures are appropriately designed, a first (e.g., red) light $\lambda_1$ can be tightly confined and guided in the center region. Shorter wavelengths can propagate in the surrounding cylindrical waveguides which have a cut-off wavelength $\lambda c < \lambda_1$. The contact (electrode) sizes are on the scale of wavelength $\sim \lambda_1$. Note: the center electrode amy be understood as a defect in the otherwise periodic pattern of electrodes.

It should be understood that "reflection" is a classical concept describing a light wave or light ray. When the structure is substantially smaller than the wavelength of the light, this classical concept no longer holds. Red light incident on top of the n1 region is neither reflected back nor transmitted through n1 region, but rather, directed to the n2 region.

Figure 11:
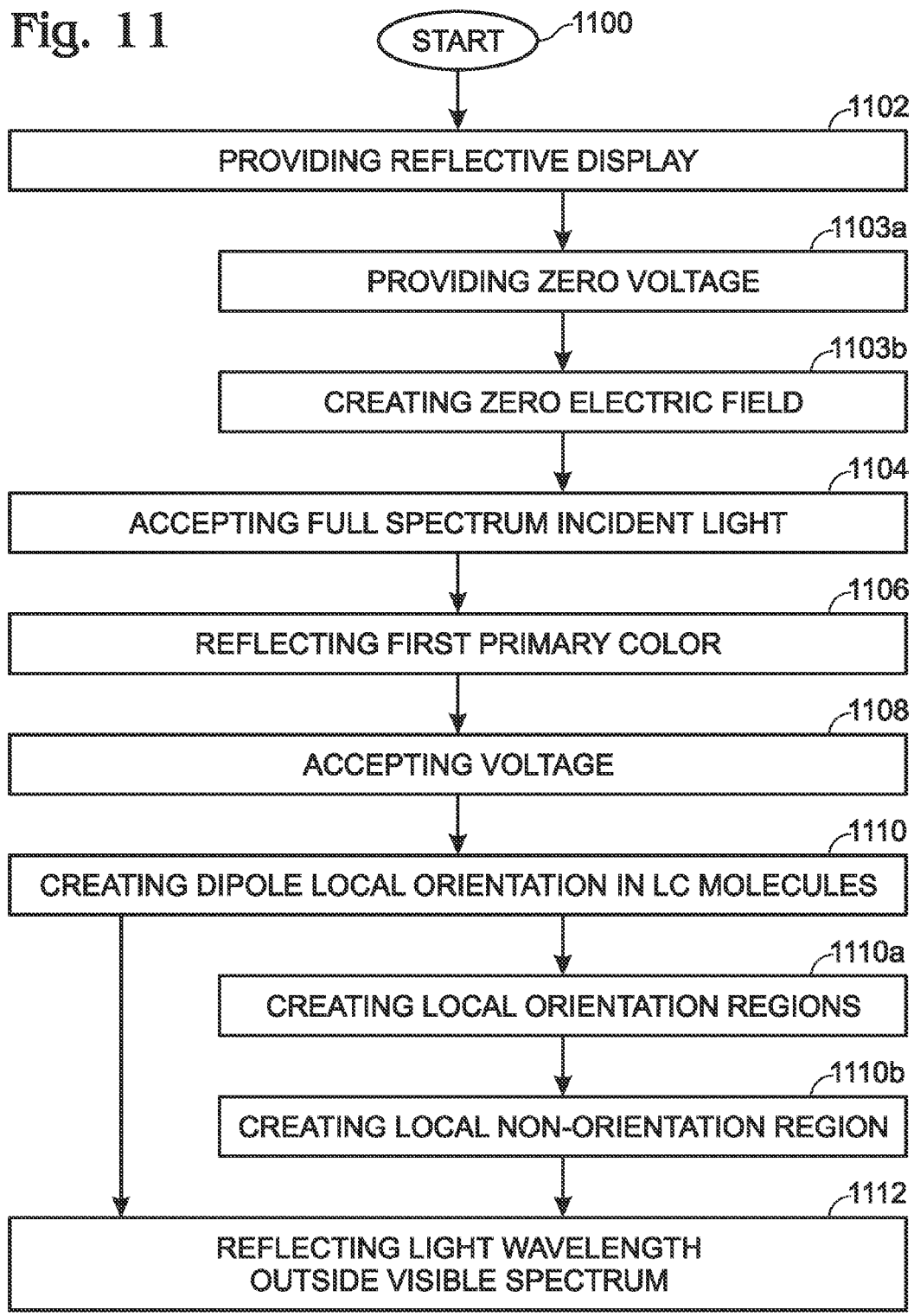
FIG. 11 is a flowchart illustrating a method for reflecting a black color in a display device enabled with an optical splitting photonic liquid crystal waveguide.

FIG. 11 is a flowchart illustrating a method for reflecting a black color in a display device enabled with an optical splitting photonic liquid crystal waveguide. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. Generally however, the steps are performed in the numeric order. The method starts at Step 1100.

Step 1102 provides a reflective display device including a set of bottom electrodes formed in a periodic pattern, and a set of top electrodes formed overlying the set of bottom electrodes in the periodic pattern. A first dielectric layer overlies the set of bottom electrodes, and is made from a liquid crystal material with molecules having dipoles responsive to an electric field. In one aspect, Step 1102. provides a first dielectric with a first index of refraction, associated with the first primary color, in response to a lack of dipole local orientation in the LC molecules. A plasmonic layer including a plurality of discrete plasmonic particles is interposed between the sets of top and bottom electrodes, and is in contact with the first dielectric layer. Step 1104 accepts a full-spectrum visible light incident to the top electrode. Step 1106 reflects a first primary color, where a primary color exhibits a single wavelength peak with a spectral full width at half magnitudes (FWHMs) in the visible spectrum of light. If the reflective display device provides top and bottom electrodes having a first diameter of about 100 nanometers (nm) and a first pitch between electrode centers of about 300 nm, then Step 1106 may reflect light with a wavelength of about 650 nm.

Subsequent to Step 1106, Step 1108 accepts a (first) voltage potential between the top and bottom electrodes, and generates an electric field. Step 1110 creates a dipole local orientation in the liquid crystal molecules in response to the electric field. Step 1112 reflects a wavelength of light outside the visible spectrum in response to the LC molecule dipole local orientation.

In one aspect, Step 1103*a* supplies a zero volt potential between the top and bottom set of electrodes. Step 1103*b* generates zero electric field between the top and bottom set of electrodes, and the lack of dipole local orientation in the LC molecules is responsive to the zero electric field. Note: the lack of dipole local orientation may also be responsive to voltages greater than zero, but less than the first voltage.

In another aspect, creating the dipole local orientation in the LC molecules in response to the electric field in Step 1110 includes substeps. Step 1110*a* creates the dipole local orientation in a plurality of local orientation regions in the first dielectric, where each local orientation region is interposed between corresponding electrodes in the top and bottom sets of electrodes. Step 1110*b* creates a lack of dipole local orientation in the LC molecules in a local non-orientation region of the first dielectric surrounding the plurality of local orientation regions. In Step 1110*a* the first dielectric exhibits the first index of refraction to the accepted light in the local non-orientation region, and in Step 1110*b* the first dielectric simultaneously exhibits a second index of refraction to the accepted light in response to the local orientation regions.

Alternately stated, simultaneously supplying the first and second indexes of refraction in Step 1110*a* and 1110*b* includes optically splitting the spectrum of incident light received in Step 1104 by channeling the first color of light through the local orientation regions and channeling a non-first color of light through the local non-orientation region. Then, reflecting the wavelength of light outside the visible spectrum in Step 1112 includes reflecting the wavelength of light outside the visible spectrum in response to the optical spectrum splitting.

A display device enabled with an optical splitting photonic liquid crystal waveguide is provided, along with an associated method or use. Examples of specific materials and structures have been used to illustrate the invention. However, the invention is not limited to merely these examples. Other variations and embodiments of the invention will occur to those skilled in the art.

We claim:

1. A display device with an optical splitting photonic liquid crystal waveguide, the device comprising:
    a set of bottom electrodes formed in a periodic pattern;
    a set of top electrodes formed overlying the set of bottom electrodes in the periodic pattern;
    a first dielectric layer overlying the set of bottom electrodes, made from a liquid crystal (LC) material with molecules having dipoles responsive to an electric field; and,
    a plasmonic layer including a plurality of discrete plasmonic particles, interposed between the sets of top and bottom electrodes, and in contact with the first dielectric layer.

2. The display of claim 1 wherein the periodic pattern of top and bottom electrodes each includes:
    an inner circle of electrodes, each having a first diameter, where adjacent electrodes are separated by a first pitch;
    an outer hexagon of electrodes, each having the first diameter, wherein adjacent electrodes are separated by the first pitch; and,
    where adjacent electrodes in the inner circle and outer hexagon are separated by the first pitch.

3. The display of claim 2 wherein the periodic pattern of top and bottom electrodes includes a plurality of concentrically arranged outer hexagons of electrodes.

4. The display of claim 2 wherein the periodic pattern of top and bottom electrodes each further includes a pattern defect enabled as a center electrode having a second diameter greater than the first diameter.

5. The display of claim 1 wherein the periodic pattern includes electrodes having a first diameter of about 100 nanometers (nm) and a first pitch between electrode centers of about 300 nm; and,
    wherein the display reflects light with a wavelength of about 650 nm in response to applying a potential of zero volts between the top and bottom sets of electrodes.

6. The display of claim 1 wherein the first dielectric layer has a first index of refraction in response to a potential of zero volts between the sets of top and bottom electrodes; and,
    wherein the first dielectric layer has an index of refraction pattern including a plurality of second index of refraction regions and a first index of refraction region formed in response to a first voltage and the pattern of electrodes.

7. The display of claim 6 wherein index of refraction pattern includes second index of refraction regions formed in the first dielectric in columns between each electrode in the top set of electrodes and a corresponding bottom electrode; and,
    wherein the first index of refraction region is formed in the first dielectric surrounding the second index of refraction regions.

8. The display of claim 7 wherein the display reflects a first color in the visible light spectrum in response to accepting full visible spectrum incident light, and in response to zero voltage between the top and bottom sets of electrodes;
    wherein the display reflects no color in the visible spectrum in response to the first voltage between the top and bottom sets of electrodes.

9. The display of claim 8 wherein the first color is transmitted through the second index of refraction regions in response to the first voltage; and,
    where a non-first color is transmitted through the first index of refraction region in response to the first voltage.

10. The display of claim 9 wherein the index of refraction pattern in the first dielectric optically splits an incident spectrum of light by channeling the first color of light through the second index of refraction regions and channeling the non-first color of light through the first index of refraction region; and,
    wherein the display reflects light having a wavelength outside the visible spectrum in response to the optical spectrum splitting.

11. The display of claim 1 wherein the sets of top and bottom electrodes are a transparent material selected from a group consisting of indium tin oxide (ITO) ZnO, Ag nanowires, and carbon nanotubes.

12. The display of claim 1 further comprising:
a second dielectric layer made from an electrically nonconductive material interposed between the plasmonic layer and a set of electrodes selected from a group consisting of the top and bottom electrodes.

13. In a display device with an optical splitting photonic liquid crystal waveguide, a method for reflecting a black color, the method comprising:
providing a reflective display device including a set of bottom electrodes formed in a periodic pattern, a set of top electrodes formed overlying the set of bottom electrodes in the periodic pattern, a first dielectric layer overlying the set of bottom electrodes, made from a liquid crystal (LC) material with molecules having dipoles responsive to an electric field, and a plasmonic layer including a plurality of discrete plasmonic particles, interposed between the sets of top and bottom electrodes, and in contact with the first dielectric layer;
accepting a full-spectrum visible light incident to the top electrode;
reflecting a first primary color, where a primary color exhibits a single wavelength peak with a spectral full width at half magnitudes (FWHMs) in the visible spectrum of light;
accepting a voltage potential between the top and bottom electrodes, and generating an electric field;
creating a dipole local orientation in the liquid crystal molecules in response to the electric field; and,
reflecting a wavelength of light outside the visible spectrum in response to the LC molecule dipole local orientation.

14. The method of claim 13 wherein providing the display device includes providing the first dielectric with a first index of refraction, associated with the first primary color, in response to a lack of dipole local orientation in the LC molecules.

15. The method of claim 14 further comprising:
supplying a zero volt potential between the top and bottom set of electrodes;
generating zero electric field between the top and bottom set of electrodes; and,
wherein providing the first dielectric with the first index of refraction includes the lack of dipole local orientation in the LC molecules being responsive to the zero electric field.

16. The method of claim 14 wherein creating the dipole local orientation in the LC molecules in response to the electric field includes:
creating the dipole local orientation in a plurality of local orientation regions in the first dielectric, where each local orientation region is interposed between corresponding electrodes in the top and bottom sets of electrodes; and,
creating a lack of dipole local orientation in the LC molecules in a local non-orientation region of the first dielectric surrounding the plurality of local orientation regions.

17. The method of claim 16 wherein creating the dipole local orientation in the local orientation regions includes the first dielectric exhibiting the first index of refraction to the accepted light in the local non-orientation region; and
wherein creating the lack of dipole local orientation in the LC molecules in a local non-orientation region includes the first dielectric simultaneously exhibiting a second index of refraction to the accepted light in response to the local orientation regions.

18. The method of claim 17 wherein simultaneously supplying the first and second indexes of refraction includes optically splitting the incident light by channeling the first color of light through the local orientation regions and channeling a non-first color of light through the local non-orientation region; and,
wherein reflecting the wavelength of light outside the visible spectrum includes reflecting the wavelength of light outside the visible spectrum in response to the optical spectrum splitting.

19. The method of claim 13 wherein providing the reflective display device includes providing top and bottom electrodes having a first diameter of about 100 nanometers (nm) and a first pitch between electrode centers of about 300 nm; and,
wherein reflecting the first primary color includes reflecting light with a wavelength of about 650 nm.

* * * * *